(12) United States Patent
Matias

(10) Patent No.: US 11,821,251 B2
(45) Date of Patent: Nov. 21, 2023

(54) LASER POWERED DOOR OPERATING SYSTEM

(71) Applicant: GMI Holdings, Inc., Mount Hope, OH (US)

(72) Inventor: Gregory D. Matias, Copley, OH (US)

(73) Assignee: GMI Holdings, Inc., Mount Hope, OH (US)

( * ) Notice: Subject to any disclaimer, the term of this patent is extended or adjusted under 35 U.S.C. 154(b) by 146 days.

(21) Appl. No.: 17/024,286

(22) Filed: Sep. 17, 2020

(65) Prior Publication Data

US 2022/0081951 A1   Mar. 17, 2022

(51) Int. Cl.
| | |
|---|---|
| *E05F 15/668* | (2015.01) |
| *E06B 9/68* | (2006.01) |
| *H02S 20/30* | (2014.01) |
| *E05F 15/43* | (2015.01) |

(52) U.S. Cl.
CPC .............. *E05F 15/668* (2015.01); *E06B 9/68* (2013.01); *H02S 20/30* (2014.12); *E05F 2015/434* (2015.01); *E05Y 2900/106* (2013.01); *E06B 2009/6827* (2013.01)

(58) Field of Classification Search
CPC .. E05F 15/668; E05F 2015/434; H02S 20/30; E06B 9/68; E06B 2009/6827; E05Y 2900/106
USPC ....................................................... 307/104
See application file for complete search history.

(56) References Cited

U.S. PATENT DOCUMENTS

| | | | |
|---|---|---|---|
| 9,225,140 B2 | 12/2015 | Della-Pergola et al. | |
| 9,312,701 B1 | 4/2016 | Mor et al. | |
| 9,705,606 B2 | 7/2017 | Alpert | |
| 9,866,075 B2 | 1/2018 | Slepoy et al. | |
| 10,404,103 B2 | 9/2019 | Alpert et al. | |
| 10,454,593 B2 | 10/2019 | Alpert et al. | |
| 10,911,224 B1* | 2/2021 | Marappan | H04W 12/106 |
| 2008/0186129 A1* | 8/2008 | Fitzgibbon | H02J 50/402 |
| | | | 340/5.2 |
| 2014/0176061 A1* | 6/2014 | Cheatham, III | H02J 50/001 |
| | | | 320/108 |
| 2018/0248411 A1 | 8/2018 | Sagi et al. | |
| 2019/0341813 A1 | 11/2019 | Slepoy et al. | |
| 2020/0153288 A1* | 5/2020 | Baumgarte | G07C 9/00174 |

FOREIGN PATENT DOCUMENTS

| | | | |
|---|---|---|---|
| EP | 1929678 B1 | | 3/2018 |
| KR | 101511059 | * | 4/2015 |

* cited by examiner

*Primary Examiner* — Daniel Kessie
*Assistant Examiner* — Dru M Parries
(74) *Attorney, Agent, or Firm* — HAYNES AND BOONE, LLP

(57) ABSTRACT

A door operating system includes a door operator; a laser transmitter; and an accessory device operatively connected to a laser receiver, the accessory device is powered, at least in part by, energy received by a laser shining at the laser receiver. A method of providing power to accessory devices associated with a door opening system includes: configuring a laser receiver to receive power from a laser; configuring the laser receiver to provide power to an accessory device; configuring a laser transmitter to convert AC power to a laser; controlling the laser transmitter with a controller that also controls a door operator.

18 Claims, 4 Drawing Sheets

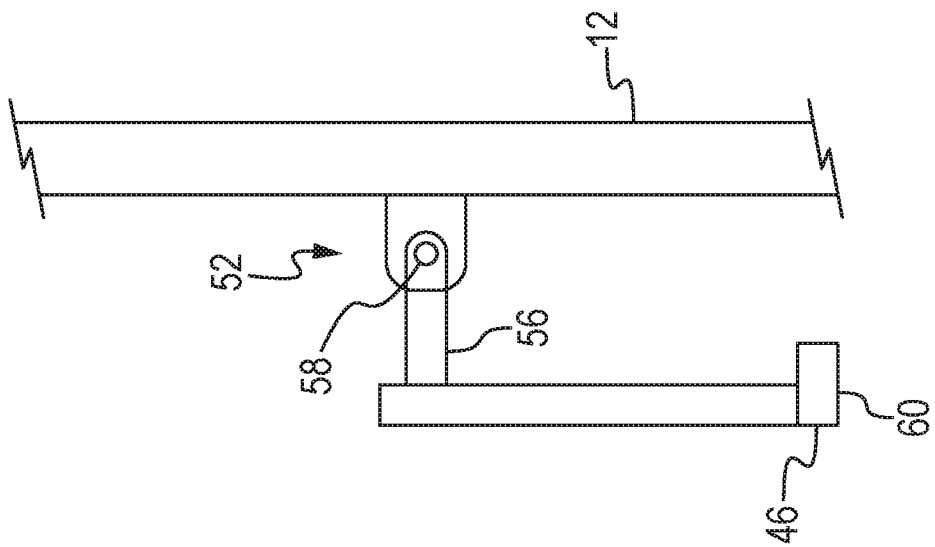
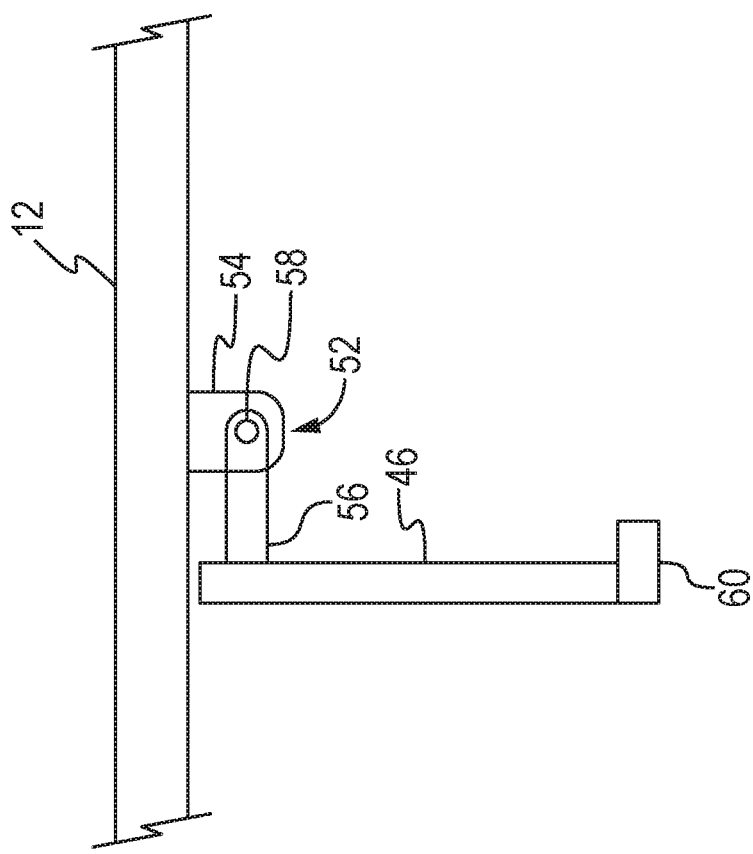

LASER POWERED DOOR OPERATING SYSTEM

TECHNICAL FIELD

This patent disclosure relates generally to door operating systems and, more particularly, to a system for powering remotely located accessories associated with the door operating system.

BACKGROUND

Doors like upward acting garage doors and commercial doors such as warehouse doors, doors at loading docks and other doors are often controlled by door operating systems. The door operating system has a motor which can be remotely controlled to open or close the door. Door operating systems often have accessories such as sensors, lights, wall consoles that may be controlled by a door operator.

The accessories often require electrical power to operate. Typically, cords are used to supply line AC power to the accessories. In some instances, the accessories may be powered by batteries. Use of cords and batteries may have certain drawbacks. For example, cords can be cumbersome and unsightly. Batteries my require a lot of maintenance such as charging or the battery will discharge and be unable to power the accessory. In view of the challenges of using power cords and batteries, it would be useful to have a door operating system that can provide power to the door system accessories without requiring the use of long power cords or using batteries as a primary source of power.

SUMMARY

The foregoing needs are met to a great extent by embodiments in accordance with the present disclosure, wherein, in some embodiments have a door operating system that can provide power to the door system accessories without requiring the use of long power cords or using batteries as a primary source of power.

In one aspect, the disclosure describes a door operating system. In some embodiments, the door operating system includes a door operator; a laser transmitter; and an accessory device operatively connected to a laser receiver, the accessory device is powered, at least in part by, energy received by a laser shining at the laser receiver.

In another aspect, the disclosure describes a method of providing power to accessory devices associated with a door opening system. In some embodiments, the method includes: configuring a laser transmitter to convert AC power to a laser; controlling the laser transmitter with a controller that also controls a door operator; configuring a laser receiver to receive power from the laser; and configuring the laser receiver to provide power to an accessory device.

In yet another aspect, the disclosure describes a door operating system. In some embodiments the door operation system includes: a door operator configured to be powered by line AC power, and the door operator includes a laser transmitter also receiving power from line AC power; and an accessory device operatively connected to a laser receiver, the accessory device is powered, at least in part by, energy received by a laser shining at the laser receiver.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 4 and 5 are side views of a laser receiver mounted to a door.

DETAILED DESCRIPTION

Figure 1:
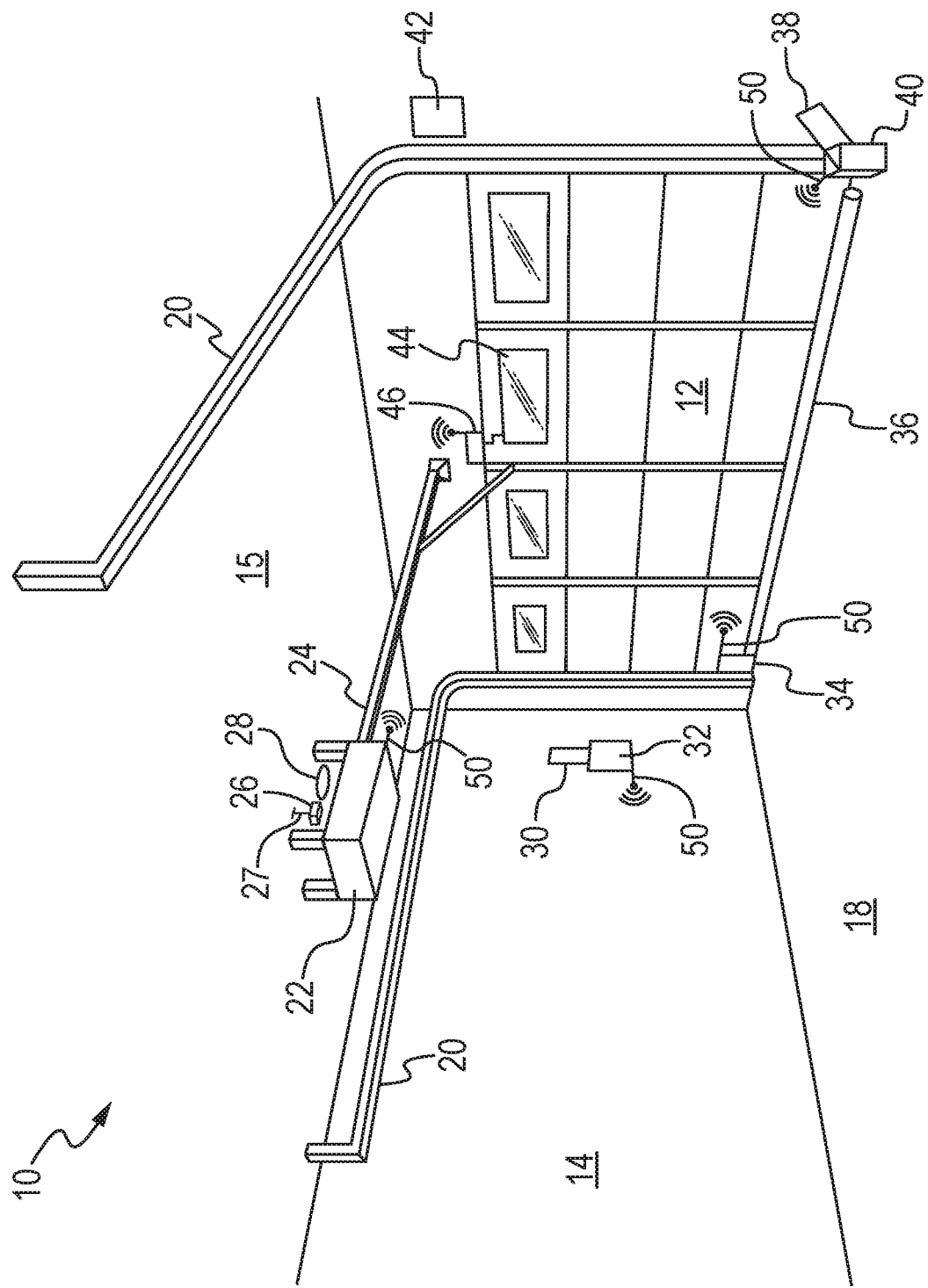
FIG. 1 is a perspective view of a door operating system in accordance with the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 is a perspective view of a door system 10 is accordance with the present disclosure. The door system 10 may be mounted in a space 11 to be enclosed such as a garage, warehouse or any other domestic or commercial building. The door system 10 operates the opening and closing of a door 12 such as an upward acting door 12 as shown in FIG. 1. The space 11 may in defined, at least in part, by the door 12, walls 14, ceiling 16 and floor 18.

Tracks 20 may be mounted to the walls 14 and/or ceiling 16 to support and guide the door 12 equipped with rollers (not shown) which roll along the tracks 20. An operator 22 is operatively connected to the door 12 to move the door 12 along the tracks 20 between open and closed positions. The operative connection may include a rail 24 connecting the operator 22 and the 12 and allow a trolley (not shown) to move along the rail 24 when the door 12 is in operation.

A power supply 26 such as a connection to an AC outlet for providing line power powers the operator 22. In some embodiments, the power supply may include a battery to provide DC power to the operator 22. In particular, batteries may provide back-up power. In such embodiments, the battery located in the power supply 26 may have a cord 27 connecting the power supply 26 to an AC outlet in order for AC power charge the battery suppling DC power to the operator. Some embodiments may include power converters to allow power to be converted between AC and DC power to provide whatever power is needed to operate the motors associated with the operator 22.

The door system 10 includes accessory devices. Some door systems use batteries or line voltage connections at the accessory devices to provide power to the accessory devices that are remotely located from the operator 22. While this method may be effective, it also has certain drawbacks such as limited battery life and aesthetic and logistical issues associated with power supply cords connecting the accessory devices to a power source.

In the present disclosure, a laser will provide power to the accessory device(s). A laser transmitter or eTransmitter 28 is connected to a power supply such as line AC power. In some embodiments, a battery (such as, for example a back-up battery) may provide DC power to the laser transmitter 28. In some embodiments, the laser transmitter 28 may be integrated or otherwise associated with the operator 22. In other embodiments the laser transmitter 28 may be remotely located from the operator 22 and may be operatively connected to the operator 22.

The door system 10, may include accessories and each accessory has a laser receiver. FIG. 1 shows a laser receiver 30 for a wall console 32. The wall console 32 is configured for sending control commands to the operator 22. Also shown are a laser receiver 34 for an edge sensor 36, a laser receiver 38 for a photo sensor 40. A laser reflector 42 is also shown. The door 12 is equipped with smart glass 44 a laser receiver 46 for the smart glass 46.

The wall console 32 is a common accessory device. It is usually wall mounted and allows a user to give control signals to the operator 22 via transmitters/receivers/transceivers 50 operatively connected to the wall console 32 and operator 22.

Other optional accessories may include Smart Glass windows 44. The Smart Glass windows 44 may be configured to be adjustable between transparent, various levels of translucent, and even opaque depending upon a current or voltage applied to the Smart Windows 44. The Smart Glass may communicate with the operator 22 via a transmitter/receiver/transceiver 50.

Sensors such as a reflective sensor 40 and edge sensor 36 may use the laser generated by the laser transmitter 28 to run along the bottom of the door 12 as an edge sensor 36 to detect obstacles. If an obstacle is detected, the laser beam will be broken and the photo sensor 40 will transmit the information to the operator 28 with the transmitter/receiver/transceiver 50.

The laser transmitter 28 emits a laser to a laser receivers 30, 34, 38, and 44, to power their related accessories 32, 36, 40, and 44. The laser receivers 30, 34, 38, and 44 convert the energy from the laser to power to supply the accessories 32, 36, 40, and 44.

In some embodiments, the laser transmitter 28 emits a different laser in a different direction depending upon what accessory is desired (or needs to be) powered.

Lights located remotely from the operator 28 and other accessories may also be powered by the laser as described herein.

Figure 2:
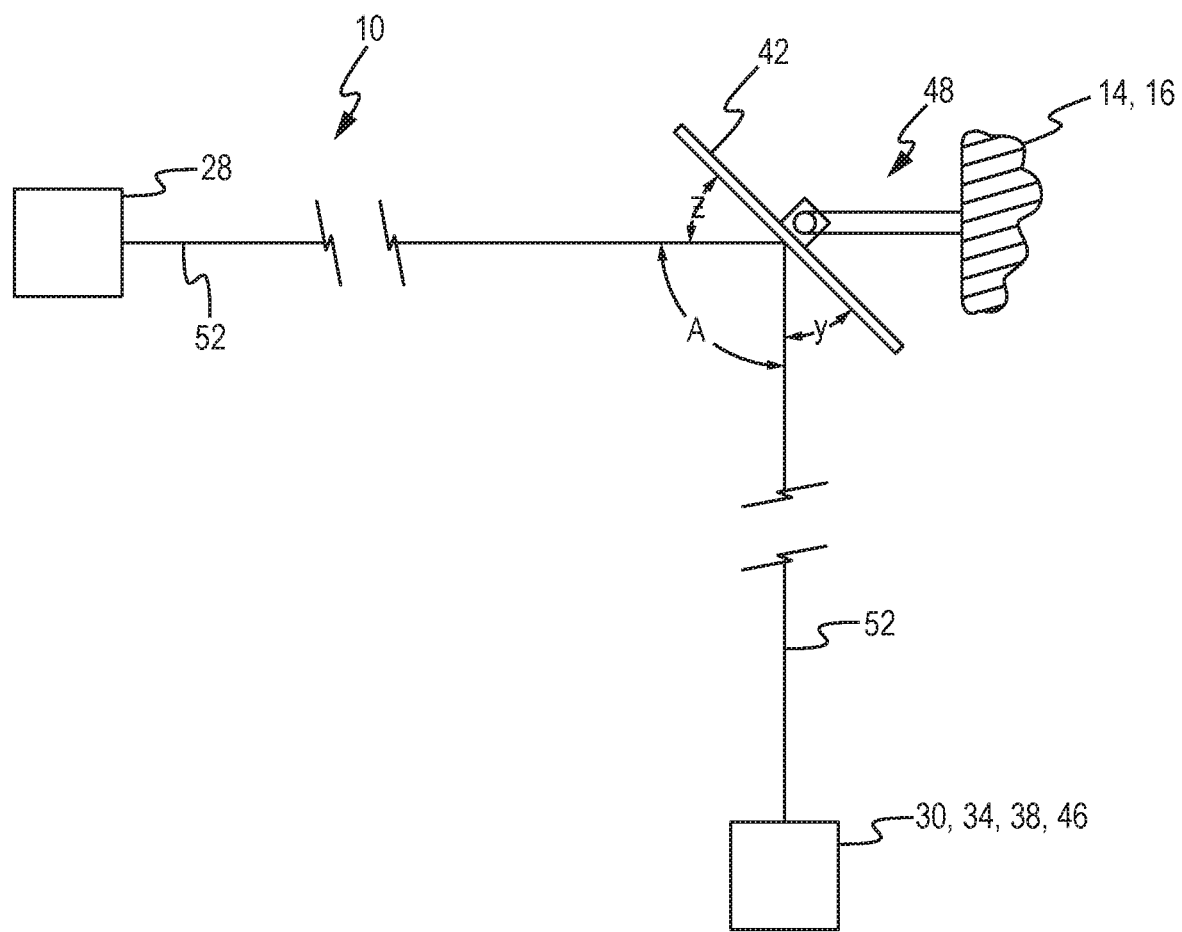
FIG. 2 is a schematic diagram of a door operating system in accordance with the present disclosure.
Figure 3:
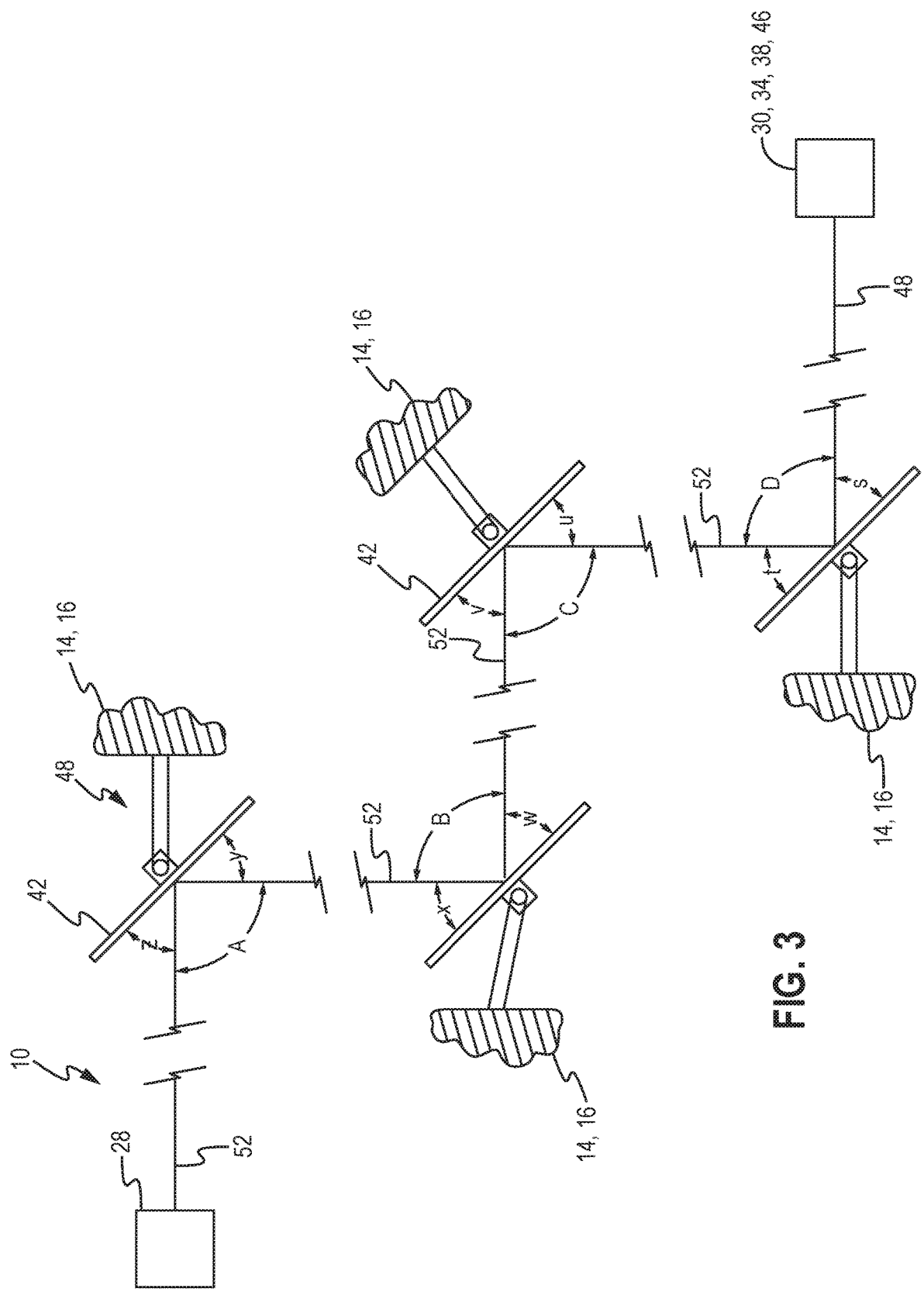
FIG. 3 is a schematic diagram of a door operating system in accordance with the present disclosure.

In the event that emitting the laser from the laser emitter 28 to the laser receivers 30, 34, 38, and 44 in a direct line-of-sight is not practical, laser reflectors 42 may be used to reflect the laser beam 52 as shown in FIGS. 2 and 3.

FIG. 2 shows an embodiment were a single laser reflector 42 is used to direct the laser beam 52 from the laser emitter 28 to the laser receiver 30, 34, 38, or 46. The laser reflector 42 may be attached with attaching structure 48 to the walls 14, ceiling 16 or any other suitable mounting surface. The laser beam 52 approaches the reflector 42 at an approach angle z and an exit angle y. The angle A is defined by the approaching and exiting laser beam 52. Angles A, z and y are selected to direct the laser beam 52 to where it is desired to go to reach the laser receiver 30, 34, 38, or 46.

FIG. 3 shows an embodiment where the laser beam 52 is reflected several times on various laser reflectors 42 on its way to the laser receiver 30, 34, 38, 46. Multiple reflectors 42 are connected to walls 14 or the ceiling 16. The approach angles z, x, v, t; the exit angles y, w, u, s; and the angles between the approach and exit beams 52 A, B, C, and D are selected to allow the laser beam 51 to be reflected to where it is desired to go. As many or as few laser reflectors 42 may be used to direct the laser beam 52 in a desired manner.

FIGS. 4 and 5 show a laser receiver 46 that is mounted to a garage door 12. In FIG. 4, the door 12 is in a horizontal orientation such as when an upward acting door 12 is in an open position. In FIG. 5, the door 12 is in a vertical orientation such as when an upward acting door 12 is in a closed position. Mounting a laser receiver 46 on a garage door 12 provides challenges in that the door 12 moves, causing the laser receiver 46 to move and change orientation. When the laser receiver 46 moves, it makes it difficult for the eTransmitter 28 to provide power efficiently to the laser receiver 46.

In order to mitigate movement and/or orientation of laser receiver 46 with respect laser emitter 28, the laser receiver 46 may be mounted with a hinged (or other movable type) mount 52 to the garage door 12. The hinge mount 52 may allow the laser receiver 46 to move as the door 12 moves to maintain an advantageous orientation with respect to the laser transmitter 28.

The hinge mount 52 may include a door mount 54 attached to the door 12 and a laser receiver mount 56 attached to the laser receiver 46. The door mount 54 and the laser receiver mount 56 may be attached to each other with a hinge pin 58 or other movable connection that allows laser receiver 46 to maintain an orientation that allows the laser receiver 46 to receive power from the laser transmitter 28. To facilitate movement to maintain a desired orientation of the laser receiver 46 when the door 12 moves, a weight 60 may be attached to the laser receiver 46 maintain the laser receiver 46 is a vertical position.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

I claim:

1. A door operating system comprising:
    a door operator configured to control movement of a movable barrier;
    a laser transmitter coupled to the door operator;
    an accessory device operatively connected to a laser receiver; and
    a laser reflector configured to reflect laser beams,
    wherein the laser transmitter is configured to emit a laser beam in a first direction, the laser reflector is configured to direct the laser beam in a second direction, and the laser receiver is configured to receive the laser beam such that the accessory device is, at least in part, powered by the laser beam, and
    wherein the laser receiver is coupled to the movable barrier, and wherein the laser receiver has a movable mount to facilitate movement of the laser receiver to maintain a desired orientation of the laser receiver as the movable barrier moves, wherein a weight is coupled to the laser receiver.

2. The door operating system of claim 1, wherein the laser transmitter is powered by line AC power.

3. The door operating system of claim 1, further comprising:
    a second accessory device operatively connected to a second laser receiver; and
    a second laser reflector,
    wherein the laser transmitter is configured to emit a second laser beam in a third direction, the second laser reflector is configured to direct the laser beam in a fourth direction, and the second laser receiver is configured to receive the second laser beam such that the second accessory device is, at least in part, powered by the second laser beam.

4. The door operating system of claim 1, wherein the accessory device includes any one of the following: a smart glass window, a wall console and a photo sensor.

5. The door operating system of claim 1, further comprising an edge sensor that is configured to use a laser beam originating from the laser transmitter as part of an edge sensing portion of the edge sensor.

6. The door operating system of claim 1, wherein the laser transmitter is powered by a battery.

7. The door operating system of claim 3, wherein the laser transmitter is configured to transmit the laser beams individually or at the same time.

8. The door operating system of claim 1, wherein an angle between the first direction and the second direction is 90 degrees.

9. The door operating system of claim 1, wherein the movable mount comprises a hinge.

10. The door operating system of claim 1, wherein the door operating system comprises a first orientation and a second orientation,
    wherein, in the first orientation, the movable barrier is horizontal and the laser receiver is vertical, and
    wherein, in the second orientation, the movable barrier is vertical and the laser receiver is vertical.

11. The door operating system of claim 1, wherein the laser reflector is spaced from the laser transmitter and the laser receiver.

12. A method of providing power to accessory devices associated with a door opening system comprising:
    receiving AC power at a laser transmitter coupled to a door operator that opens and closes a movable barrier, the door operator being configured to control the laser transmitter and a movement of the movable barrier;
    converting, by the laser transmitter, the AC power into a laser beam and emitting the laser beam in a first direction;
    directing, by a laser reflector, the laser beam in a second direction;
    receiving, at a laser receiver coupled to an accessory device, the laser beam directed by the laser reflector, wherein the laser receiver is coupled to the movable barrier, and wherein the laser receiver has a movable mount to facilitate movement of the laser receiver to maintain a desired orientation of the laser receiver as the movable barrier moves, wherein a weight is coupled to the laser receiver; and
    powering the accessory device using, at least in part, the laser beam.

13. The method of claim 12, wherein the accessory device includes any one of: smart glass, a wall console and a sensor.

14. The method of claim 12, further comprising: after directing, by a laser reflector, the laser beam in a second direction, directing, by a second laser reflector, the laser beam in a third direction.

15. A door operating system comprising:
    a door operator configured to be powered by line AC power, the door operator including a laser transmitter configured to receive power from the line AC power and to emit a laser beam in a first direction using the AC power, wherein the door operator is further configured to control movement of a movable barrier;
    a laser reflector configured to redirect the laser beam from the first direction to a second direction; and
    an accessory device operatively connected to a laser receiver,
    wherein the laser receiver is configured to receive the laser beam emitted by the laser transmitter and redirected by the laser reflector such that the accessory device is powered, at least in part by, energy received by the laser beam, and
    wherein the laser receiver is coupled to the movable barrier, and wherein the laser receiver has a movable mount to facilitate movement of the laser receiver to maintain a desired orientation of the laser receiver as the movable barrier moves, wherein a weight is coupled to the laser receiver.

16. The door operating system of claim 15, wherein the door operator and laser transmitter are configured to also operate on DC power.

17. The door operating system of claim 15, wherein the accessory device is any of the following: smart glass, a wall console, a light, and a sensor.

18. The door operating system of claim 15, wherein the movable mount allows the laser receiver to maintain the same orientation as the door changes orientation.

\* \* \* \* \*